(No Model.)

E. K. CHAMBERLIN.
SIDEWALK LIGHT.

No. 273,257. Patented Mar. 6, 1883.

WITNESSES,
John T. Bourke
Geo. C. Davies

Edward K Chamberlin INVENTOR,
By Geo. C. Tracy
ATTORNEY.

UNITED STATES PATENT OFFICE.

EDWARD K. CHAMBERLIN, OF CLEVELAND, OHIO.

SIDEWALK-LIGHT.

SPECIFICATION forming part of Letters Patent No. 273,257, dated March 6, 1883.

Application filed July 20, 1882. (No model.)

*To all whom it may concern:*

Be it known that I, EDWARD K. CHAMBERLIN, of Cleveland, in the county of Cuyahoga and State of Ohio, have invented a new and useful Improvement in Sidewalk-Lights; and I do hereby declare that the following is a full, clear, and exact description of the same, reference being made to the accompanying drawings, and to letters of reference marked thereon.

My invention relates to certain improvements in sidewalk-lights of the kind in which glass of various forms is used, in combination with iron panels, plates, or frames, for lighting basements, basement-extensions, areas, or for supplying light by means of skylights to interiors.

In the common form of such lights there is great loss of light through its absorption by the opaque non-reflecting substance in which the glasses set. As the lenses or squares of glass are of necessity quite thick relatively, the amount of light absorbed by the sides is considerable. It is my purpose therefore to prevent this loss of light, and do this without any considerable increase in the cost of these lights, by means of the invention illustrated in the accompanying drawings, in which—

Figure 1:
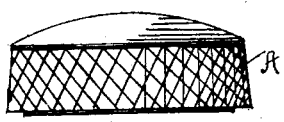
Figure 2:
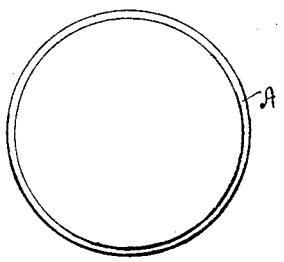
Figure 3:
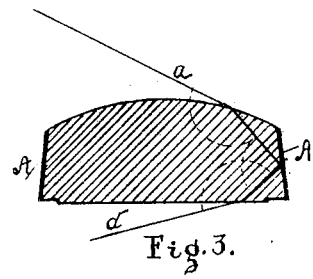
Figure 4:
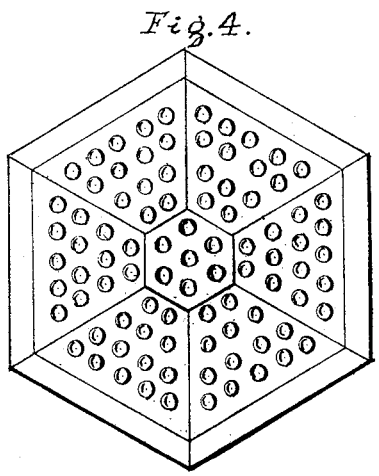

Figure 1 is a side view, Fig. 2 a top view, and Fig. 3 a vertical sectional view, of one of my improved lenses or glasses, which may be of any other shape desired without conflicting with the object of my invention. Fig. 4 is a top view of a man-hole or coal-hole cover, showing how the lenses or lights are used.

My invention broadly consists in coating the edges or sides of the lenses or glasses with a reflecting film of amalgam, or any metallic or other film or foil which is reflecting in its nature, so that a ray of light, as shown in Fig. 3, striking the film A in the line $a$, will be deflected and enter the apartment below in the line $d$, instead of being absorbed, as would be the case were the glasses surrounded by absorbent material.

Any form of glass or frame for holding the same may be used, and any reflecting substance may surround the same.

I claim as my invention and desire to secure by Letters Patent—

1. A reflecting film or foil upon the sides of glasses in sidewalk or similar lights, as and for the purpose set forth and described.

2. The combination, with the glasses of a sidewalk or skylight, of an amalgam film or foil of a reflecting quality, as set forth and described.

3. In a glass for sidewalk or skylights, the combination of the glass and reflecting material or substance, in the manner and for the purposes set forth and described.

This specification signed and witnessed this 29th day of June, 1882.

EDWARD K. CHAMBERLIN.

Witnesses:
GEO. C. TRACY,
JOHN T. BOURKE.